(No Model.) 2 Sheets—Sheet 1.
D. S. HITCHCOCK.
MUD GUARD FOR BICYCLES.
No. 509,032. Patented Nov. 21, 1893.
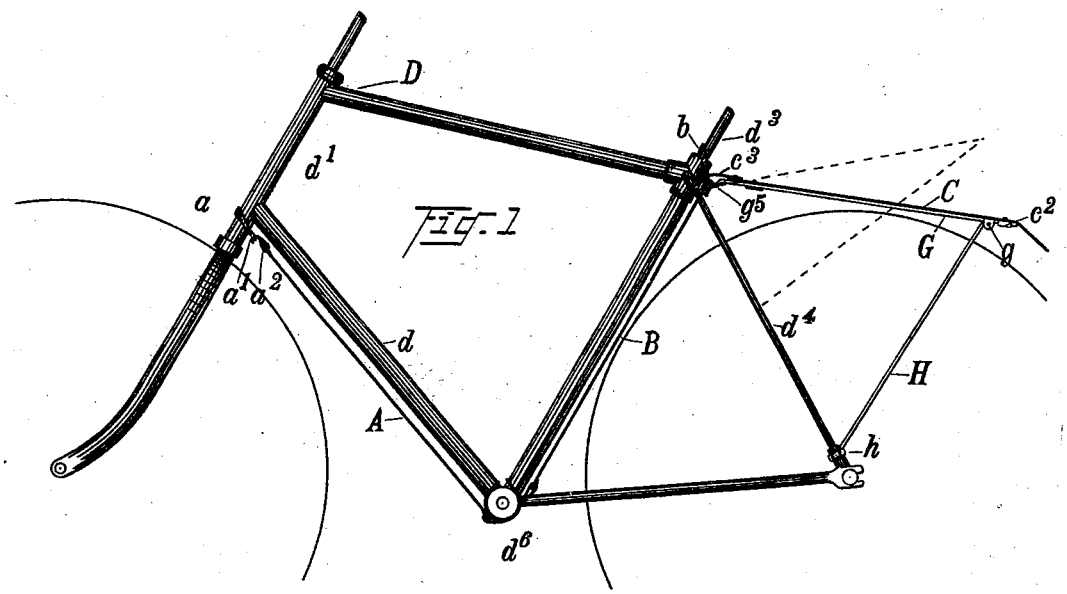
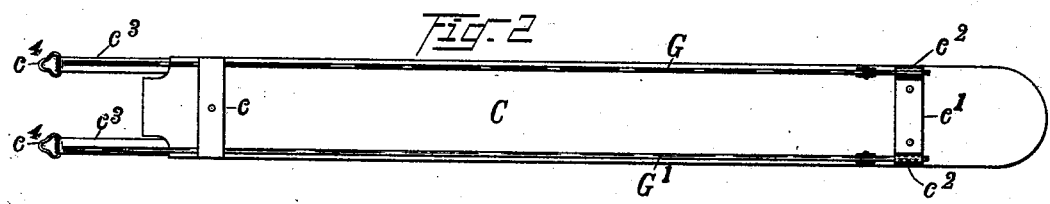
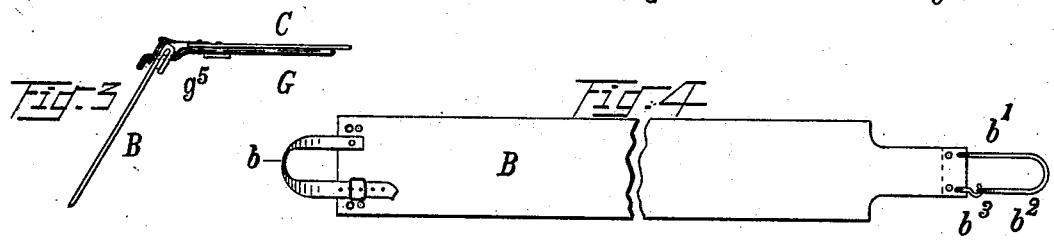
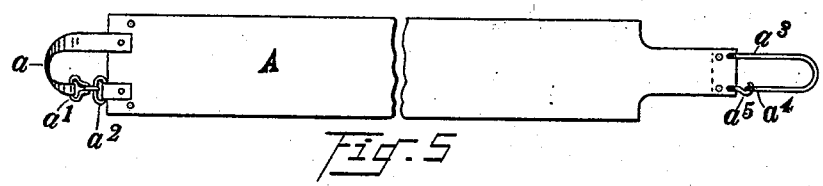
WITNESSES.
INVENTOR.
David S. Hitchcock
By Wing & Thurston
his attorneys

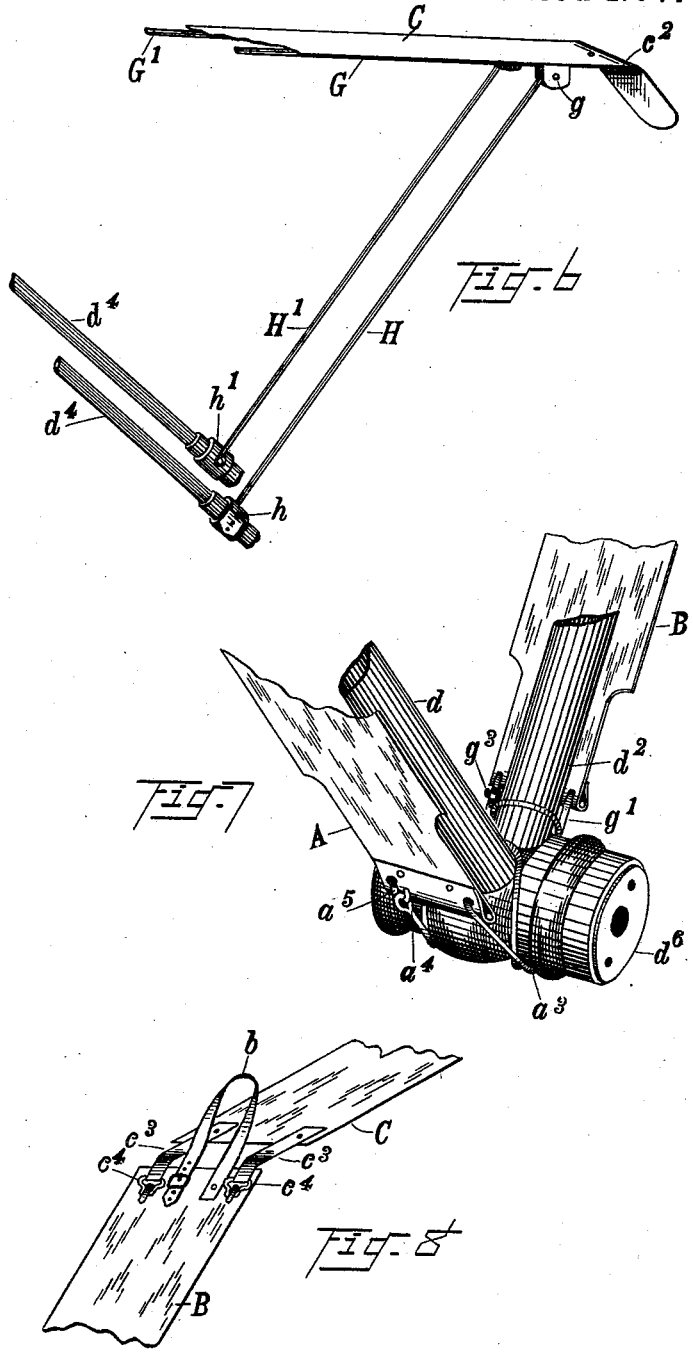

UNITED STATES PATENT OFFICE.

DAVID S. HITCHCOCK, OF CHICAGO, ILLINOIS, ASSIGNOR TO THE SUNOL BICYCLE COMPANY, OF SAME PLACE.

MUD-GUARD FOR BICYCLES.

SPECIFICATION forming part of Letters Patent No. 509,032, dated November 21, 1893.

Application filed May 27, 1893. Serial No. 475,674. (No model.)

*To all whom it may concern:*

Be it known that I, DAVID S. HITCHCOCK, a citizen of the United States, residing at Chicago, in the county of Cook and State of Illinois, have invented certain new and useful Improvements in Mud-Guards for Bicycles; and I do hereby declare the following to be a full, clear, and exact description of the invention, such as will enable others skilled in the art to which it appertains to make and use the same.

My invention relates to the construction of a mud guard for bicycles and to the mode of attachment of said guard to the vehicle.

The object of the invention is to provide a light, flexible mud guard which can be readily detached from the bicycle when not needed and rolled up and carried in the tool bag or in the pocket of the rider, taking the place of the stiff heavy metallic mud guard which has heretofore been used.

My improved mud guard is described in the following specification and shown in the accompanying drawings forming a part thereof, in which—

Figure 1 is a side view of the frame of a bicycle showing the improved mud guard attached thereto. Figs. 2, 3, 4 and 5 are enlarged detached views of the guard hereinafter fully explained. Fig. 6 is an enlarged detached perspective view of the rear portion of the guard. Fig. 7 is an enlarged perspective view showing the manner of attaching the guard to that portion of the frame forming the bearing of the sprocket wheel shaft and Fig. 8 is a perspective view showing the connection of the rear and middle parts of the guard and the manner of attachment to the frame at that point.

Similar letters of reference designate like parts in the drawings and specification.

The guard as shown in the drawings is composed of three strips of flexible material A, B and C connected with each other and with the frame of the bicycle by cords, straps, elastic bands, wires and hooks and eyes, the location of which will presently be explained. The strips A, B and C may be of leather, canvas or other suitable material. The strip A extends under the lower tube $d$ of the frame D, Fig. 1, and is attached to the steering sleeve $d'$ by the elastic band $a$ which is attached at one end to the strip A and has at its other end an eye $a'$ which, after the band has been passed around the steering sleeve, engages the hook $a^2$ on the strip A, as best shown in Fig. 5. A cord $a^3$ is attached to the lower terminal of the strip A, said cord being provided with an eye $a^4$. The cord $a^3$ passes under the crank bracket $d^6$, around the substantially vertical brace $d^2$ and back under the bracket $d^6$, the eye $a^4$ engaging the hook $a^5$. The middle strip B lies behind and substantially parallel to the brace $d^2$, the upper terminal being attached to the rear fork yoke $d^3$ by means of the strap $b$ which passes around said yoke. To the lower end of the strip B is attached a cord $b'$ similar to the cord $a^3$. Said cord passes under the crank bracket $d^6$ around the lower tube $d$, back under the bracket, the eye $b^2$ engaging with the hook $b^3$.

The lower ends of the wires H H', Figs. 1 and 6, are pivoted on a rivet which is fastened to the straps $h$ $h'$, while the upper terminals of said wires are hinged to the wires G G' as shown at $g$. The straps $h$ $h'$ are buckled around the rear fork tubes $d^4$ $d^4$, and the forward terminals of the wires G G pass through two holes in the upper end of the strip B, the said ends being bent down to form shoulders $g^5 g^5$ which prevent said wires from passing too far. The wires H H' and G G' being of the proper length and arranged as above described, will form the framework shown in Figs. 1 and 6. The strip C is attached to the upper part of the said framework, i. e., to the wires G G', by means of the metallic plates $c$ $c'$ which are riveted to the under side of the strip G. The ends of the forward plate $c$ extend under the wires G G' while the rear plate $c'$ is provided with two eyes $c^2$ $c^2$ into which the ends of the wires G G' enter. The plate $c'$ by the above described construction, also serves to hold the wires G G' apart. To the forward end of the strip C are attached two elastic straps $c^3$ $c^3$ provided at their free terminals with eyes $c^4$ $c^4$. These eyes are slipped over the ends of the wires G G' which are bent down as shown, whereby the eyes will not be liable to be accidentally removed, nor can the wires be withdrawn from the strip B.

It will readily be seen that straps or other devices may be used to fasten the ends of the flexible strips instead of the cords, and "vice versa," without departing from the nature of my invention.

When it is desired to remove the mud guard, the strips A B C are simply disconnected from each other and from the frame, and may be rolled up; while the wires H H' and G G' fold together swinging on the hinge at $g$ and are strapped or tied to the rear fork tubes.

The rear portion of the mud guard may be elevated as shown by dotted lines in Fig. 1, by buckling the straps $h\ h'$ around the fork tubes farther up.

Having now fully described my invention, what I claim, and desire to secure by Letters Patent, is—

1. The combination of a bicycle frame, of two wires H H', an adjustable pivoted connection between their lower ends and the bicycle frame, the wires G G' pivotally connected at their forward ends with the bicycle frame, and having their rear ends hinged to the upper ends of the wires H H', substantially as and for the purpose specified.

2. The combination with a bicycle frame of two wires H H' pivotally connected at their lower ends to the tubes $d^4\ d^4$ of the bicycle frame, with the two wires G G' hinged at their rear ends to the upper ends of the wires H H' and having detachable connections between their front ends and the bicycle frame, substantially as and for the purpose specified.

3. In a bicycle, the combination of wires supported over the rear wheel with a flexible strip having secured to its under side the plate $c'$ having eyes, substantially as and for the purpose specified.

4. A detachable mud guard for bicycles consisting of strips of flexible material passing respectively below the lower tube $d$, center brace $e$, and over the rear wheel, attached to the frame of the bicycle by suitable fastening means, in combination with a mud guard frame constructed of wires G. G'. and H. H' which are hinged together and extend over the rear wheel, substantially as described.

5. A detachable mud guard for bicycles consisting of strips of flexible material passing beneath the lower tube $d$, center brace $d^3$ and over the rear wheel, attached to the frame of the bicycle by cords and straps, in combination with wire rods H H' strapped to the rear fork tubes extending upward therefrom, and wire rods G G' pivoted to the rods H H' extending forward over the rear wheel and passing through the middle flexible strip, substantially as specified.

6. In a detachable mud guard for bicycles, a strip of flexible material extending under the lower tube of the frame, attached to the steering sleeve by a band or strap and to the center brace by a cord passing beneath the crank bracket, a strip of flexible material passing behind the center brace and similarly attached at its ends to the rear fork crown and lower tube, a strip of flexible material extending over the rear wheel attached to two parallel wires pivoted to two depending wires which are in turn pivoted to straps circumscribing the rear fork tubes, the forward terminals of said parallel wires passing through holes in the middle flexible strip and engaging eyes attached to the free terminals of the straps $c\ c$ of the upper flexible strip, substantially as and for the purpose specified.

In testimony whereof I affix my signature in presence of two witnesses.

DAVID S. HITCHCOCK.

Witnesses:
FRANK H. WEBSTER,
CHAS. E. PECK.